April 9, 1957 M. FARBER 2,788,255
STYLUS INDEXING ARRANGEMENT FOR ENGRAVING MACHINES
Filed Dec. 8, 1953
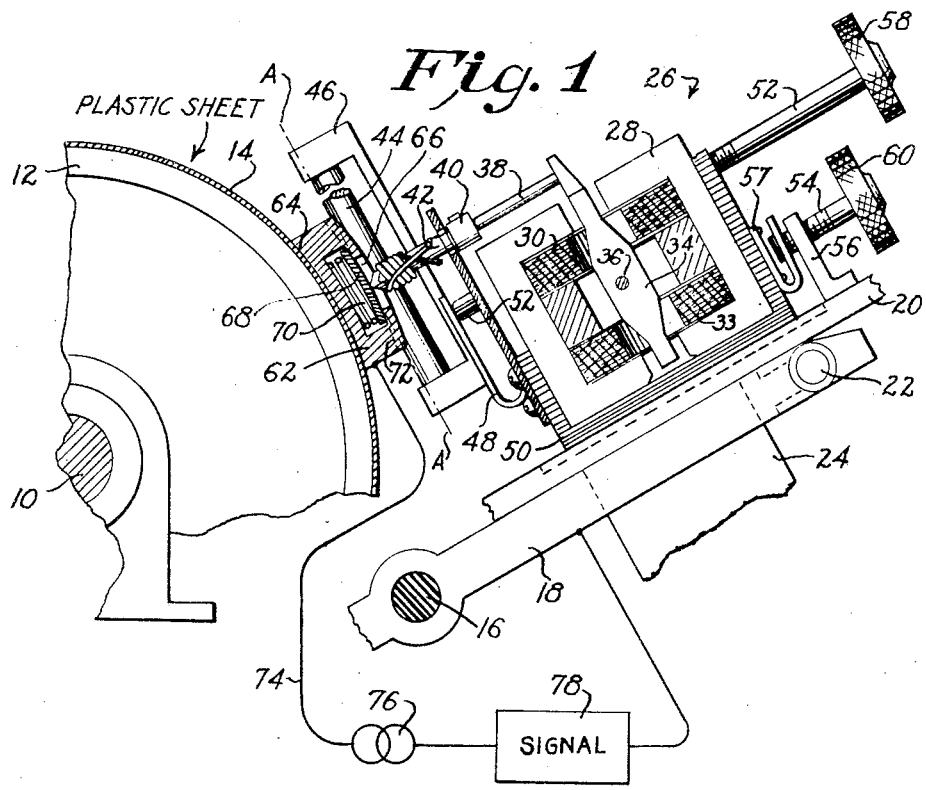
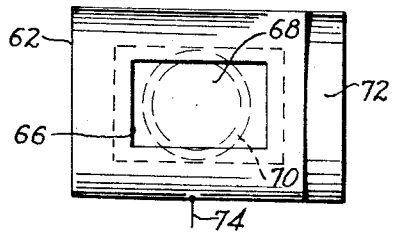
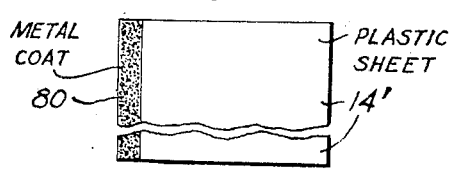
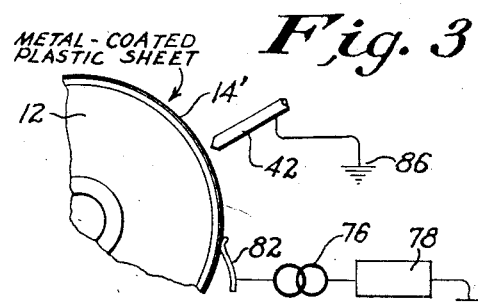
INVENTOR:
Monroe Farber,
BY
Homer R. Montague
ATT'Y United States Patent Office 2,788,255
Patented Apr. 9, 1957

2,788,255

STYLUS INDEXING ARRANGEMENT FOR ENGRAVING MACHINES

Monroe Farber, Jericho, N. Y., assignor to Fairchild Camera and Instrument Corporation, a corporation of Delaware Application December 8, 1953, Serial No. 396,955

4 Claims. (Cl. 346—77)

This invention pertains to automatic engraving machines, such as are used for the production of relief printing plates or the like automatically from photographic or other originals. A principal object of the invention is to provide means for indicating, with great precision, the position of the point of the engraving stylus with respect to the surface which is to be engraved, and which is in general carried by a rotating cylinder.

An automatic engraving machine of a type to which the invention is particularly applicable is well shown and described in the U. S. patent to Boyajean, No. 2,575,546, issued November 20, 1951, to the assignee of the present application. As disclosed in that patent, a preferred form of such apparatus comprises a pair of cylinders mounted for synchronous rotation upon a common shaft, one of said cylinders being arranged to carry the original copy in position for helical scanning by photo-electric means, and the other cylinder carrying a plastic flexible plate upon which a representation of the original is engraved in a helical path by the action of an electromagnetic motor controlled from the output of the photo-electric scanner. One of the more critical features of such apparatus lies in the necessity for extremely accurate positioning of the engraving point of the stylus with reference to the surface of the plate of plastic which is to be engraved. Heretofore, this has been accomplished by making a trial cut upon the plastic, the result being observed through a suitable microscope, and necessary adjustments made accordingly. Such a procedure, while reasonably effective, is somewhat cumbersome and involves an operation of the machine which is in itself not essential to the production of the desired engraving. To facilitate the making of the adjustment, the engraving machine of the prior patent was provided with means such as an "advance shoe" adapted to contact physically the surface of the plastic sheet to be engraved, at a location adjacent to and actually somewhat in advance of the location of the stylus itself, so that the position of the stylus driving motor with reference to the plastic sheet could be accurately maintained. However, this arrangement requires some way of locating the neutral position of the stylus accurately with respect to the contacting surface of the advance shoe which rides upon the plastic sheet.

It is accordingly a principal object of the present invention to provide ways and means for establishing, prior to the making of an engraving, a desired precise relationship between the tip of the stylus and the datum plane defined by the advance shoe when the latter is moved into position to contact the sheet to be engraved. Preferably, the arrangement of the present invention is so organized that achievement of the proper relationship between these two parts of the apparatus will be physically indicated as by a buzzer, light, or equivalent signalling means. The use of such a signal renders operation under the invention extremely simple, since it does not involve any precise visual inspection of the parts which are under adjustment.

A further object of the invention is to provide an electrically operated gauging means which may be utilized with an engraving machine under the exact conditions in which it is next to be operated. Thus, once the adjustment has been made, none of the adjusting devices provided in such operation need to be altered in order to proceed with the desired engraving operation.

An additional object of the invention is to provide a gauge of the above type whose operation cannot normally result in any injury either to the delicate stylus or to the other parts of the apparatus, as might be experienced if a careless operator were to adjust the stylus with great force against the gauge.

In a further aspect of the invention, it is an object thereof to provide an improved form of engraving sheet of plastic material, having a localized or over-all treated area which will, in combination with equipment to be described, simplify the gauging operation itself.

As will be well understood with those familiar with equipment of this type, it is sufficient to establish a known relationship between the tip or cutting point of the stylus and the datum plane defined by the contacting surface of the advance shoe. Actually, the use of the apparatus with such an adustment would not normally involve the proper degree of penetration of the plastic sheet which is to be engraved. However, the skilled worker, once having established a known relationship between the parts, can readily make the necessary adjustments to accomplish the desired depth of engraving for a particular job in hand. That is, he can readily advance or retract the stylus itself with reference to the position of the advance shoe, so that the total penetration resulting therefrom will produce a plate having the proper reproduction characteristics.

The above and other objects of the invention, and the advantages provided thereby in use, will best be understood by referring now to the following detailed specification of certain preferred embodiments thereof, and illustrated in the accompanying drawings, in which:

Fig. 1 is a view in vertical section of the parts of an engraving machine essential to the understanding of the present invention, with parts being broken away;

Fig. 2 is a front elevational view of the gauge element itself of Fig. 1;

Fig. 3 is a diagrammatic view of a modified form of the invention; and

Fig. 4 is a fragmentary view of a portion of a modified plastic engraving sheet suitable for use with the embodiment of the invention shown in Fig. 3.

Fig. 1 of the drawing shows only those parts which are essential to an understanding of the present invention, these parts being located near the engraving stylus and its guide means. In that figure, numeral 10 designates the main shaft of the engraving machine, carrying the cylinder 12 upon which is secured the sheet 14, of plastic or like material which is to be engraved. A plastic sheet 14 is illustrated in the drawings, and since such material is inherently an electrical insulator, it will serve to insulate the gauge (which is to be described) from the frame of the apparatus. Where a metallic sheet is employed, it may be insulated from the cylinder, and hence from the machine frame, as by an insulating coating on its underside, or the cylinder itself may be of non-conductive material or otherwise insulated from the machine.

The engraving stylus and its motor, and associated parts, are carried lengthwise of the cylinder 12, as upon guide rods paralleling shaft 10, one such guide rod being indicated in Fig. 1 by numeral 16. The sliding carriage for the stylus drive mechanism is indicated by numeral 18, and a stylus motor base 20 is shown as pivoted at 22 upon carriage 18. As described in the prior patent referred to above, the stylus motor (and hence the stylus) may be retracted away from the cylinder 12 by pivoting upon pivot 22, but during operation, it is held in the position shown in Fig. 1 of the drawings, as by an electromagnet 24. The stylus motor itself is designated by numeral 26, and comprises the magnetic structure 28 and drive coils 30 and 32. An armature 34 is pivotally mounted as by a torsion bar 36, in such a way that energization of coils 30 and 32 will cause the armature to pivot (twisting bar 36) and drive the rod 38 toward and away from the axis of cylinder 12. Rod 38 terminates in a stylus chuck 40, in which is held the stylus 42 which may be provided with heating means, such as a heating coil surrounding the stylus. All of these parts are as described in the prior patent.

Reference was made above to a locating means disposed to ride upon the surface of the plastic just in advance of the stylus; such an advance shoe is shown in Fig. 1 as a cylindrical rod 44, preferably of a very hard and smooth material such as sapphire or the like, and this element is held as in a mounting frame 46 carried by a hairpin spring 48 secured at its lower end to a frame structure 50 which contains the stylus motor 26. In order to permit adjustment of the advance shoe 44 with respect to the neutral or other position of the stylus 42, a push-rod 52 is threadedly carried by the frame 50 or other element, and its forward end engages the hairpin spring 48 and urges it against the spring tension to position to forward surface of advance shoe 44 in a precisely defined position. Movement of the entire stylus and motor assembly toward and away from the cylinder 12 is accomplished by a screw 54 which threadedly engages a bracket or other portion 56 fixed upon plate 20. Since this adjustment is to regulate the "neutral" or unenergized position of the stylus point relative to the cylinder for a given advance shoe setting, screw 54 does not have a solid connection to stylus motor 26, but instead acts through a spring relief indicated at 57. Suitable adjusting knobs 58 and 60 are provided for the shafts 52 and 54.

The gauging element 62 of Fig. 1 is formed of conducting material such as metal, and is in the form of a block or the like, whose under-surface 64 is curved cylindrically to conform to the curvature of a plastic sheet carried by cylinder 12. Its front surface, or that opposite its surface 64, is also preferably curved on an arc similar to that of the rear surface. The front surface of gauge 62 has a centrally located window 66 opening into a pocket in the interior of the gauge, and within this pocket is disposed a contact plate 68 of conductive material which is urged against the inner surface of the marginal portion of aperture 66 as by a spiral spring 70. Since the advance shoe 44 is disposed, as illustrated in Fig. 1, behind the position of stylus 42, said advance shoe may ride upon a marginal portion surface of gauge 62, for example upon the marginal portion designated in Fig. 2 by numeral 72. The surface of this marginal portion is located below the front surface of the rest of the gauge, so that when stylus 42 contacts plate 68, the stylus tip will be in desired position only a few thousandths of an inch ahead of the advance shoe forward surface indicated by plane A—A in Fig. 1. Thus, the contacting surface of advance shoe 44 will be adjusted to be tangent to the front surface of portion 72 of gauge 62, just as it would be tangent to the sheet 14 during the making of an actual engraving.

Since the advance shoe 44 is itself an insulator, and since gauge 62 is insulated from plastic sheet 14, movement of the metallic stylus 42 in a direction toward the axis of cylinder 12 will ultimately cause an electric contact to be made between the tip of the stylus and the contact plate 68. The body of gauge element 62 is connected as by a conductor 74 to a source of voltage 76, which in turn is connected through a signal device 78 to any convenient part of the machine frame, such as the carriage 18.

With the parts adjusted so that advance shoe 44 rides upon the forward surface of portion 72 of gauge 62, the operator can readily adjust shaft 54 and thereby move the stylus forward until its tip completes a circuit with contact plate 68, which will be indicated by operation of the signal 78. Stop 52 is then set to hold the shoe in this position. Thereafter, the entire stylus assembly may be retracted as by pivoting at 22, and gauge element 62 removed. The stylus and its drive motor may then be pivotally returned to the Fig. 1 position, and the operator may bring the advance shoe into contact with the plastic sheet 14 by manipulation of rod 54. In so doing, the position of the tip of the stylus with respect to the surface of the plastic will be accurately established, and any necessary adjustments for depth of cut or the like may be made thereafter in the usual way, without disturbing the relationship of the advance shoe and the stylus tip. A dash line "A" in Fig. 1 indicates the tangent plane of shoe 44 and gauge 62.

The voltage source 76 may be either direct or alternating, depending upon the nature of signal device 78 and the desired type of indication. Of course, if the stylus is of the heated type, the adjustment with gauge 62 would be made with the stylus in its heated condition, in order to eliminate dimensional changes which would otherwise occur with the heating-up of the stylus. Also, it is to be understood that since stylus 42 may readily be given a small fore-and-aft oscillation by the operation of coils 30 and 32 in the manner described in the prior patent referred to above, it is quite feasible to make the gauging adjustment with the stylus undergoing such oscillation. If this is the case, since contact is made only at the greatest forward excursion of the stylus toward the contact plate 68, the signal circuit will be made and broken, intermittently, at a frequency corresponding to the oscillatory period of the stylus. A simple electromagnet and armature may then be used as a buzzer for signal 78.

The resilient mount of contact plate 68 provided by spring 70 permits the plate to have slight movement towards the surface of the cylinder 12, and this prevents any possibility of injury to stylus 42 in the event that it is accidentally adjusted too far in the forward direction, so that the proper adjusted position is overrun. Spiral spring 70 also provides a positive electrical connection between the plate 68 and the body of the gauge 62. In the event that it is desired to use the gauge in connection with apparatus in which the advance shoe 44 is not in itself an insulator, it is readily apparent that an insulating section may be provided in the marginal area 72 (Fig. 2) which the advance shoe may contact without short-circuiting the signal arrangement.

Placing the contact plate 68 within a recess or pocket in gauge 62 has several advantages. The surface of the contact plate is protected against casual damage, which is desirable since very small errors in stylus position may have very serious effects on the quality of the engravings. The position of the front surface of the plate 68 is accurately and positively located with reference to the rear gauge surface 64, regardless of changes in the spring 70. Finally, and perhaps most important, this construction permits the signal to be given when the tip of stylus 42 is actually considerably ahead of the datum plane defined by the advance shoe 44. Remembering that the forward tip plane of the stylus and the advance shoe datum plane will coincide only for a neutral (un-energized) condition of the stylus in which it barely scratches the plastic 14, it will be realized that its maximum forward excursion (into the plastic) will place the tip somewhat ahead of the advance shoe datum plane. By properly selecting the distance from the front surface of gauge 62 to the front surface of plate 68, the proper stylus position, considering the usual stylus amplitude, may be arrived at automatically, so that only corrections for the copy characteristics or printing process to be used need be made by the operator.

A modification of the invention is illustrated in Fig. 3 of the drawings, which has been simplified to eliminate all non-essential parts. The cylinder is again indicated by numeral 12, and the stylus by numeral 42. In this embodiment the plastic sheet which is to be engraved is modified in order to facilitate the gauging function, and is designated by numeral 14'. This sheet is provided with a thin metal coating, which may be sprayed thereon or otherwise deposited, and the coating may for example be placed only along one marginal portion of the sheet as indicated by numeral 80 in Fig. 4. In this embodiment, a contact shoe or brush, preferably of springy material, is arranged to ride upon the surface of the plastic sheet. Such a contact brush or finger is indicated by numeral 82 in Fig. 3, and is connected to voltage source 76 and signal 78, the circuit being completed through the machine frame as indicated at grounds 84 and 86.

The embodiment shown in Figs. 3 and 4 of the drawings has the considerable advantage that no separate gauging element is required, since the brush 82 and the auxiliary electrical portions of the signal circuit may be included as permanent parts of the machine organization. The metal contact represented by the coating 80 on sheet 14' will then automatically be supplied with each new sheet of plastic.

It will be seen from the above that I have provided ways and means for accomplishing all of the objects of my invention, but it is to be understood that the specific arrangements and devices described above are given for purposes of illustration, and not of limitation. Various modifications of the inventive concept will occur to those skilled in the art, and I intend to claim all such as fall within the spirit of the invention as defined in the appended claims.

What is claimed is:

1. An electric indicator gauge for indicating the position of a movable stylus with respect to a cylinder, comprising a housing having one cylindrical concave surface adapted to conform to the surface of said cylinder, and an opposite convex surface coaxial therewith, said opposite surface being apertured to expose a contact plate recessed within said unit, whereby to energize an external signalling circuit in response to contact between said stylus and said plate.

2. A gauging device in accordance with claim 1, including means for mounting said contact plate resiliently within said unit for movement in the general direction of stylus travel as it approaches said unit.

3. A gauging device in accordance with claim 1, including means for positively limiting the movement of said contact plate towards the convex outer surface of said gauge.

4. An electric indicator gauge for use with an engraving machine of the kind having a movable support for a sheet to be engraved, and an engraving head including a stylus, an advance shoe for contacting a sheet on said support, and a stylus adjustable toward and away from the sheet with respect to said advance shoe, said gauge comprising a housing having one wall shaped to engage the sheet on said support, an opposite parallel wall being apertured at one portion to receive the tip of said stylus, a contact plate within said housing engageable by the stylus through said aperture, and another portion of said opposite wall being positioned to be engaged by said advance shoe and located precisely in the plane of the outer surface of said contact plate.

References Cited in the file of this patent
UNITED STATES PATENTS

| | | |
|---|---|---|
| 816,307 | Eaton | Mar. 27, 1906 |
| 1,933,792 | Dalton | Nov. 7, 1933 |
| 2,435,514 | Ross | Feb. 3, 1948 |
| 2,575,546 | Boyajean | Nov. 20, 1951 |
| 2,626,884 | Ewing | Jan. 27, 1953 |